Dec. 21, 1948.  A. E. KREMILLER  2,456,712
HYDRAULIC CONTROL MECHANISM
Filed March 13, 1945  3 Sheets-Sheet 1

Inventor
Arthur E. Kremiller
By R. S. Berry
Attorney

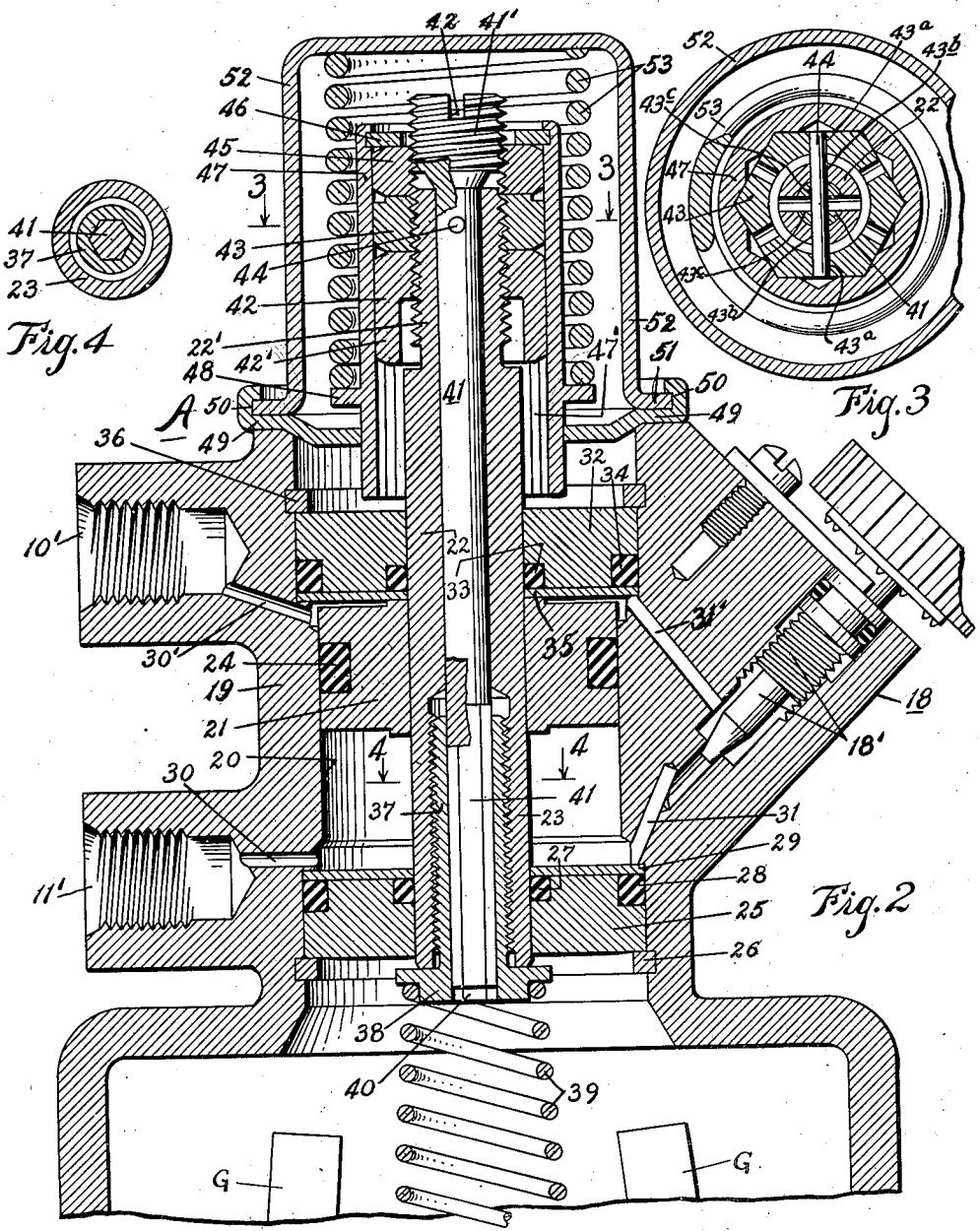

Dec. 21, 1948.   A. E. KREMILLER   2,456,712
HYDRAULIC CONTROL MECHANISM

Filed March 13, 1945   3 Sheets-Sheet 3

Inventor
Arthur E. Kremiller

Patented Dec. 21, 1948

2,456,712

UNITED STATES PATENT OFFICE 2,456,712

HYDRAULIC CONTROL MECHANISM

Arthur E. Kremiller, Glendale, Calif., assignor to Adel Precision Products Corp., a corporation of California Application March 13, 1945, Serial No. 582,460

5 Claims. (Cl. 60—54.6)

This invention relates to hydraulic control mechanisms, and while it has many different uses and applications, I have shown it applied to a governor control for controllable-pitch propellers for airplanes and the like, whereby the adjustment and control of said governor is more accurately accomplished, and is made more definite and certain, and consequently the control of the pitch of the propeller blades is more accurately and definitely accomplished.

Engine manufacturers specify the maximum R. P. M. desired for their engines, and the propeller governor must have a limit setting such that no matter what the pilot does, or what happens to the system, the engine will not overspeed.

Aircraft manufacturers request that some means be provided for automatically returning the governor setting to an intermediate R. P. M. position in case of failure of one or the other of the lines of the hydraulic system.

To accomplish all these desired conditions in a practical, definite and efficient manner, are among the salient objects of this invention, thus making it possible to predetermine the effective length of the piston rod, or acting member connected therewith, and which engages, or connects with, the governor spring of a propeller speed governor, with the necessary adjustments made possible to accomplish all of these purposes.

In order to explain the invention, I have shown it in connection with a propeller speed governor of conventional form, together with the mechanism of a hydraulic control system, which I will now describe.

Fig. 1 is a schematic drawing, in side elevation, with parts in section, of a system such as referred to;

Fig. 2 is an enlarged vertical sectional view through the hydraulic control mechanism constituting the invention;

Fig. 3 is a cross sectional view taken on line 3—3 of Fig. 2;

Fig. 4 is a cross sectional view taken on line 4—4 of Fig. 2; and

Referring now in detail to the drawings, the invention is shown for explanatory purposes in connection with a system which includes a power or master means, designated as a whole P, connected with an actuator, or slave element, designated as a whole A, with an equalizer, or makeup reservoir, designated as a whole E, interposed therebetween and connected therewith.

Figure 1:
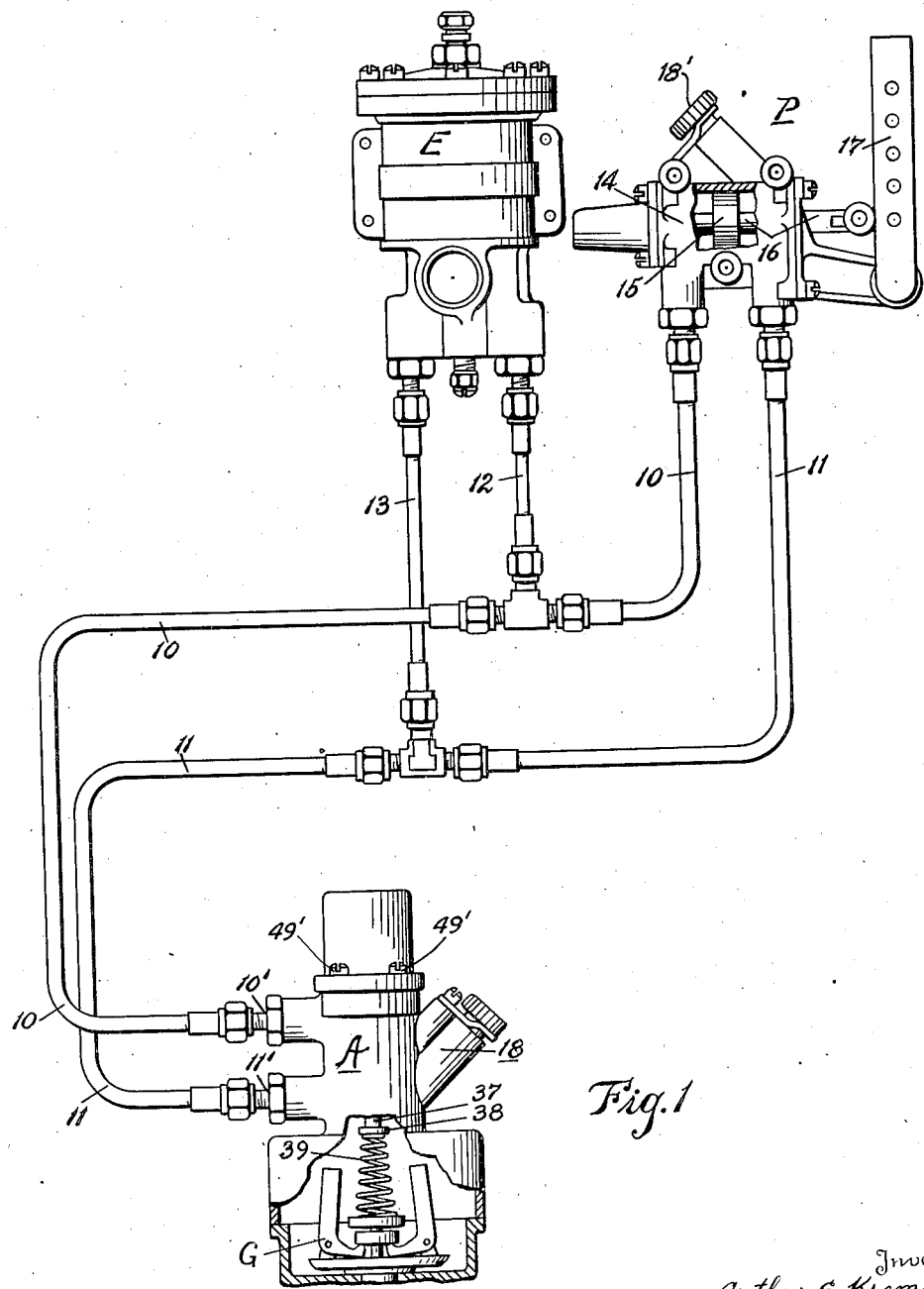

The power, or master control means P, is connected by means of pipes 10 and 11, with the actuator, or motor element A, as shown in Fig. 1, while the equalizer or make-up reservoir E is connected with said pipes 10 and 11, by the pipes 12 and 13, respectively.

The manual control, or power means P, includes a cylinder 14, with a piston 15 therein, said piston having its piston rod 16 extended through one end of the cylinder 14, and operatively connected with an operating handle 17, whereby said piston can be moved manually back and forth in said cylinder for forcing operating fluid through one of said pipes 10 or 11, from one end of said cylinder 14, while drawing fluid into the other end of said cylinder through the other pipe, in a manner which will be understood from the showing in Fig. 1. Additionally the unit P is provided with a by-pass channel interconnecting the opposite ends of the cylinder 14 with an interposed normally closed manually operable valve 18' adapted when open to permit the flow of fluid from one side to the other incident to the filling of the system and subsequent synchronizing of the power and motor elements or to disable the system in a manner and for a purpose hereinafter to be described. A similar by-pass is shown in detail in Fig. 2.

The equalizer, or make-up reservoir E, is of standard construction and operates automatically, in a known manner, to keep the fluid supply in the pipes 10 and 11 up to a normal pressure, and to compensate for expansion or contraction of the active operating fluid in said pipes 10 and 11, in the power means P, and in the actuator element A. Because this mechanism is well known in the art, it is not considered necessary to show more details thereof, as it is not per se a part of the invention herein claimed.

The actuator or motor element, designated as a whole A, constitutes the invention of this application, and is shown in enlarged vertical sectional view in Fig. 2, and operates on the governor which controls the pitch of the propeller blades, also well known in the art. The invention really has to do with a variable active length of the actuating piston rod or member, and its adjustability and operation.

Referring to Figs. 2, 5, 6 and 7, the places of connection of the pipe lines 10 and 11 are designated by said numerals being placed at the points of connection, as 10' and 11', respectively, as will be clear from the showing.

On these figures also, the standard synchronizing screw and means for by-passing the piston in bleeding the system, and for synchronizing purposes is designated as a whole 18. As this is standard equipment, and is well known, further details are not described.

Figure 5:
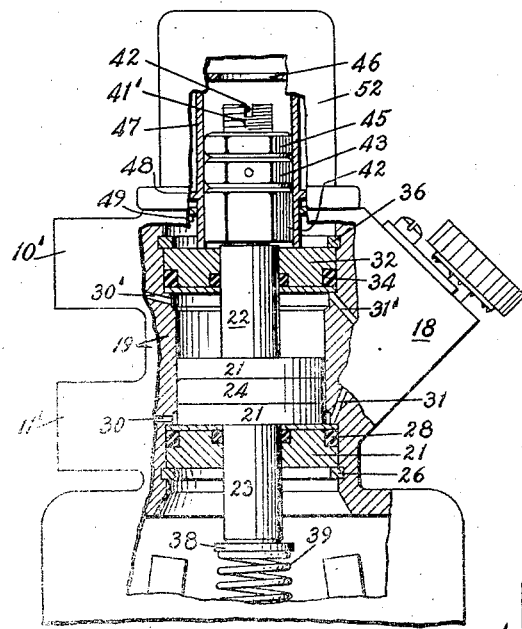
Figs. 5, 6 and 7 are views, partly in section, showing the parts in different positions of adjustment.
Figure 7:
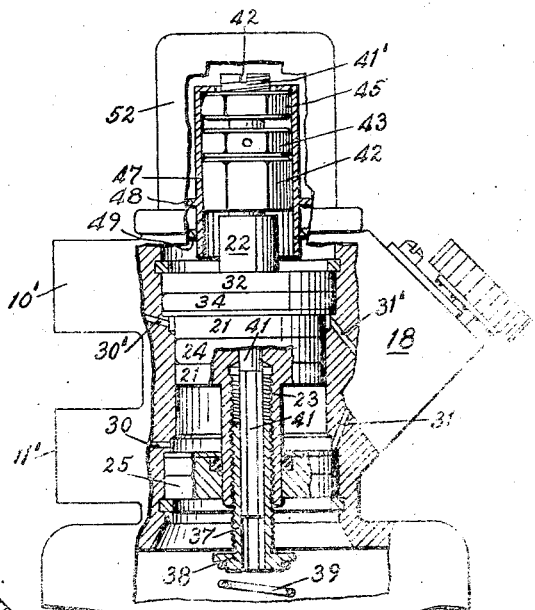
Figure 6:
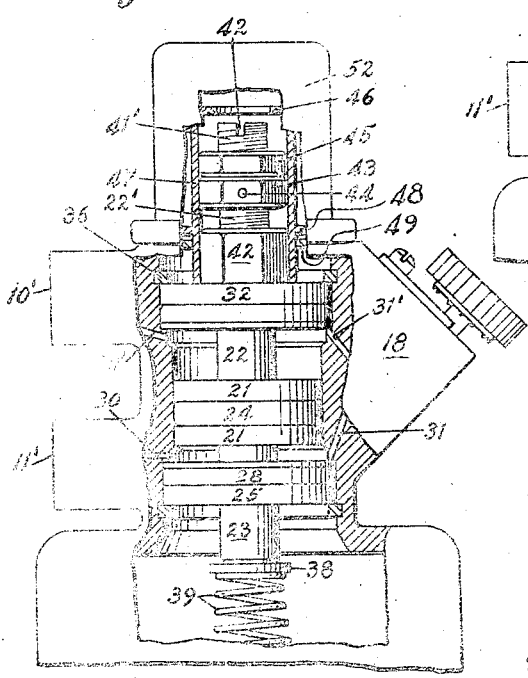

Referring in particular to Fig. 2, I will describe the invention proper. The same parts in Fig. 2, and also in Figs. 5, 6 and 7, are given the same reference numerals.

The body 19 has therein a cylindrical chamber 20, in which operates a piston 21, having at its opposite sides, that is: top and bottom, two hollow piston-rod extensions or members 22 and 23, shown in sectional view in said Fig. 2. Said piston has the usual packing or sealing means, designated 24. These are preferably of oval form in cross section, as indicated.

In the lower part of the chamber 20, enlarged in diameter, is an end member 25, held in place by a snap retaining ring 26, and in its top it is provided with sealing rings, as 27 and 28, and with a flat washer-like member 29 on top thereof, as shown, forming a floor and stop for said chamber, with port 30 leading to the pipe connection at 11', and with a bore 31, to said by-passing mechanism 18, above referred to.

In the upper part of said chamber 20, is an upper end member 32, provided with sealing rings, as 33 and 34, and a washer-like stop member 35, above said piston 21, said upper end member being held in place by a snap ring 36, as shown. A port 30' is shown leading from the pipe connection 10' to said cylinder chamber 20, above the piston 21, and also a port 31' leading from the upper port of said chamber 20 to the by-pass mechanism 18. These ports 30' and 31' correspond to the ports 30 and 31 from the lower part of said chamber 20. A valve member 18' is provided for controlling said by-pass mechanism 18. It will be noted that the two piston rod extension members 22 and 23 work through the end members 25 and 32.

I will now describe in detail the means and method of accurately varying the active length of the piston rods or members and the stop means provided in connection therewith.

The lower end of the piston rod or member 23, is internally threaded to receive an externally threaded sleeve, or member 37, having at its lower end a head 38, fitted over the upper end of the coiled spring 39 of the propeller speed governor, designated as a whole G, a standard and well known mechanism.

The sleeve or member 37 internally is of non-circular configuration, here shown to be hexagonal, as at 40, to receive the corresponding lower end of an adjustment rod 41, extending through both the upper piston rod or member 22, the piston proper 21, and the lower piston rod or member 23, as clearly shown, and provided on its upper end with an enlargement, or head 41', externally threaded and provided with an operating slot 42. Thus, before insertion of the locking pin 44 or after the temporary removal thereof to permit adjustment as will hereinafter be more fully described, upon turning said adjustment rod 41 relative to the piston rod 22, the sleeve or member 37, and its head 38, can be moved upwardly or downwardly effecting a variation of the distance of the head 38 from the piston 21 with a consequent variation of the tension initially applied to the governor spring 39, as will be clear from the showing made in said Fig. 2, and seen in extended position in Fig. 7.

The upper piston rod or member 22, at its upper end, is somewhat reduced in diameter and externally threaded, as at 22', to receive stop means, adjustable thereon, and including a stop nut 42, having a skirt-like portion 42' capable of extending alongside of and parallel to the unthreaded position of the piston rod or member 22, incident to its adjustment hereinafter to be described. Above this stop nut is a nut 43, provided with a circumferentially spaced series of cross bores 43ª adapted to register with one or the other of a pair of transverse bores 43ᵇ in the piston rod 22 and simultaneously with one or the other of a pair of transverse bores 43ᶜ in the adjustment rod 41 for reception of a cross-pin 44 which pin, as shown in Fig. 3, is thereby operative to prevent relative rotation between the parts through which it extends. The threaded portion 41' of the adjustment rod 41 carries a head nut 45, and above that head nut is a washer element 46, set in the upper end of a cylindrical enclosure member 47 and which has an external stop flange 48 toward its lower end, as clearly shown.

The interior of said cylindrical member 47 is provided with a series of equally spaced longitudinally extending grooves adapted to engage the corners of the nuts 42, 43 and 45 and to prevent rotation thereof relative to said member 47 and to each other when enclosed by said member. The grooves are preferably of a number which is a multiple of the number of sides or corners of the nuts thus permitting an adjustment thereof within very narrow limits (see Fig. 3).

The member 47 comprises part of a subassembly which includes a base element and closure member 49 adapted to be secured to the upper end of the body member 19 by screws 49' and provided with an opening through which the lower end of the member 47 may extend. The member 49 has its edges inturned as at 50 to receive and hold the outturned flange portion 51 of a cap member 52 of inverted cup form which houses the cylindrical member 47 and the parts contained therewithin and the end of which cap member serves an abutment for one end of a compression spring 53 and the other end of which engages one side of the flange 48 on the member 47 (see Fig. 2). The opposite face of the flange 48 engages the upper face of the base member 48 when the subassembly is removed from the body member 19 and thus prevents the disassembly of the component parts. The purpose for and mode of operation of the spring 53 will appear hereinafter in connection with the description of the mode of operation and adjustment of the motor unit.

In the type of propeller pitch governor here shown, as the governor weights increase in speed and react against the spring 39, they cause a valve to be operated so as to effect an increase or "coarsening" the pitch of the propeller blades until a point is reached at which considering the load on the propeller and the force exerted by by the spring 39, the motor operates at a predetermined speed. Obviously by increasing the initial compression of the spring 39 a higher rate of motor speed will be required for a given propeller pitch. Furthermore on different airplanes and with different motors there will be different ranges of speed required and different propeller pitches within those speed ranges. The present invention contemplates a single device which, either by adjustment to meet a given construction during assembly, or by a change in the field, can be adjusted to meet a changed condition. Additionally, as has been before pointed out the invention contemplates safety means so that if one or both of the hydraulic lines connecting the master or power elements with the slave or motor element is broken, shot away or otherwise disabled, the pilot is able by merely opening an auxiliary valve to cause the device to apply automatically a certain predetermined load on the governor spring 39 so that thereafter a predetermined propeller pitch will be maintained until repairs can be made. It will be noted that the initial load of the governor spring 39 is achieved by adjustment of the member 37 longitudinally of the piston rod 22 through the instrumentality of the rod 41.

To achieve the various adjustments in the field the device is installed and the piston is moved to its extreme upper position and the speed of the motor is noted. At this time the member 37 is retracted to its full extent within the piston rod. The proportions of the device is such that it is certain that under these conditions the minimum speed of the motor will be below that desired. After noting the speed the subassembly including the base element 49 is removed, and the cross pin 44 is taken out of the nut 43', piston rod 22 and the adjusting rod 41 after which the adjusting rod 41 is turned to extend the element 37 from the end of the piston rod with consequent compression of the governor spring 39 and an increase in the speed of the motor until the desired minimum speed is reached. The nut 43 and adjusting rod 41 are then adjusted slightly in one direction or another until a series of holes are in alignment for reception for the cross pin 44. The device is then operated to move the piston downwardly until the approximate top speed is reached as indicated by the tachometer associated with the motor and when this point is reached the stop nut 42 is moved downwardly until it comes into contact with the end member 32 of the cylinder.

The next point to receive adjustment is the emergency adjustment which will be determined by the amount of downward travel imported to the piston by the spring 53 in the event the hydraulic control of the piston is disabled. The extent to which this will take place is determined by the position of the nut 45 on the threaded portion 41' of the adjusting rod 41. As will be noted particularly in Fig. 2, the farther up along the threads 41' the nut 45 is moved, the more the sleeve element 47 will be lifted away from the face of the end member 32 when the piston is in its extreme upper position and consequently if the hydraulic system is disabled, the further the spring 53 will be enabled to move the piston downwardly. Normally this adjustment is made by moving the piston downwardly under the control of the hydraulic apparatus until the desired emergency speed of the motor is reached and the distance to which the piston rod has traveled downward is noted. The distance from the under face of the washer or collar 46 to the opposite end of the member 47 being known, the nut 45 can then be moved upwardly or downwardly on the threads 41' until that distance is reached. Thereafter when the subassembly is replaced over the three adjusting nuts with slight rotating movements of each to accommodate the grooves in the sleeve member 47 the nuts will be secured to their adjusted position and in the event of an emergency operation, the spring 53 will move the sleeve member 47 downwardly until the lower end thereof engages the face of the cylinder end member 32 and by reason of its engagement with the upper face of the nut 45, it will move the piston rod and piston downwardly with incident compression of the governor spring 39 to a point where the predetermined emergency operation speed will be established. In this connection it should be appreciated that the strength of the spring 53 is sufficient to overcome any opposition by the governor spring 39 but is not too great to be overcome by the normal operation by the device since there is sufficient power and resistance in the manual operation to overcome the pressure exerted by the spring 53 when the piston is moved to its extreme upper position lifting the sleeve member 47 free from the cylinder end member 32. After an initial adjustment of the various elements has been made, it is of course desirable to check the adjustment in an actual flight test of the plane after which corrections can be made if necessary.

Referring now to Fig. 5 there is shown an adjustment of the various elements in which the stop nut 42 is moved to its extreme upper position which incidentally leaves it completely free from the cylinder end member 32 when the piston reaches the bottom of its stroke. Also the nut 45 has been moved to its extreme retracted position so that when the piston is moved to its extreme upper position, the sleeve 47 will be lifted only slightly. Additionally the extension end member 37 and the head thereof 38 as here shown retracted to its extreme position.

In Fig. 6 the nut 45 is shown in the same position as occupied in Fig. 5 but the nut 42 has been moved down to limit the extent of its downward movement of the piston or piston rod.

In Fig. 7 a third variation of adjustment is shown in which the nut 45 is moved upwardly on the threads 41', thus lifting the sleeve element 47 to a greater extent when the piston is moved to its extreme upper position than would be the case in the adjustments shown in Figs. 5 and 6. Additionally the member 37 has been extended thus compressing the governor spring 39 to a greater extent when the piston is moved to its extreme upper position than would be the case when the member is retracted as shown in Figs. 5 and 6, thus producing a higher initial minimum speed of the motor.

It will be understood of course that these illustrated adjustments are merely representative of certain possible combinations of the three independent adjustments of the elements involved and that in actual practice any one of the adjustments can be made completely independent of the others to suit individual conditions. Furthermore it will be noted the limit of travel of the operating end of the piston rod can be varied as to extent at both ends of its travel by means located at the other end of the piston rod and that additionally at the same end of the piston rod a third adjustment means is provided to determine a proper operating speed in case of an emergency.

Referring now to the function of the so-called balance spring 53 and assuming that one of the fluid lines has been ruptured, the pilot will have no control over the propeller pitch and the force of the spring 39 would tend to move the piston to the open position. In such an event it is necessary only for the pilot to open the by-pass valve 18' on the master or power unit allowing fluid flow between both ends of the cylinder on the master unit. As soon as this is done the spring 53 will have sufficient force to move the sleeve 47 downwardly until the lower end thereof engages the adjacent face of the end member 32 of the cylinder and since the washer 46 at the upper end of the member 47 is in engagement with the nut 45, the piston will also be moved downward the desired amount depending on the adjustment of the nut 45 on the threaded portion 41' thus compressing the governor spring 39 and causing the propeller pitch to assume such a character as will provide a reasonable motor speed in the emergency condition.

While in the above described series of adjustments the general procedure in making a field adjustment has been described, it will be appreciated that it is equally possible to make initial adjustments of the various parts in the initial assembly of the apparatus, reference being had to suitable gages to determine the maximum speed, minimum speed or emergency operation speed as determined by the position of the various stops and the distance to which the member 37 and head 38 are extended from the piston rod.

I claim:

1. In a mechanism of the character shown and described, a cylinder having end members and means for connecting a source of operating fluid to and from the opposite ends of said cylinder, a piston moving therein, a piston rod extended from the opposite sides of said piston through said end members, one end of said piston rod being the operating end and provided with means engageable with a mechanism to be controlled, means on the other end of said piston rod, outside of said end member, and adjustable to function as a stop for the movement of said piston in one direction, other adjustable means at said other end of said piston rod arranged to determine the limit of travel of said piston and piston rod in the event of failure of the operating fluid and means engageable with both of said adjusting means constructed and arranged to prevent dislodgement thereof from the adjusted positions.

2. In a mechanism of the character referred to, in combination with a cylinder and piston working therein, a piston rod extension from the opposite sides of said piston, one end of said piston rod being threaded and provided with a nut to function as a stop nut, a sleeve over the end of said piston rod and said stop nut and movable thereover, means interlocking the inside of said sleeve and said stop nut against relative rotation, a spring over the outside of said sleeve and operable to automatically move said sleeve, said stop nut and said piston rod and piston to a predetermined position, and operating connections on the other end of said piston rod for engagement with the part to be moved.

3. In hydraulic control mechanism, a cylinder with a double acting piston operating therein, means for connecting a source of operating fluid with the opposite ends of said cylinder, said cylinder having end members closing its opposite ends, a piston rod extended from the opposite sides of said piston and operating through said end members, one end of said piston rod having means for extending and retracting its active length, and the other end of said piston rod being provided with an adjustable stop nut adapted to be set to engage the end member, to limit the movement in one direction of said piston, means adjacent said stop nut operable to effect the extension or retraction of the active length of said first named end of said piston rod, other means including a nut adjacent said last named means adapted to determine an emergency operating position of said piston rod means for locking said extension and retraction means, said emergency operating position determining means and said stop nut in adjusted position, and spring means for automatically moving said piston rod to a predetermined operating position if failure of operating fluid results from any cause.

4. In hydraulic control mechanism, a cylinder having end members and means for connecting operating pressure fluid with its opposite ends, a double acting piston operable therein to be moved in opposite directions by presure fluid, said piston having a piston rod extending from through said end members, one end of said piston rod being its work end, to be connected with mechanism to be moved, the other end of said piston rod being provided with adjustable abutment means effective to induce movement of said piston rod and piston, whereby to determine the movement of the work end of said piston rod, a coiled spring operable on the adjustable abutment means to move said piston rod and piston to a predetermined operating position in case of failure of operating fluid, and an enclosure cap member for said spring, stop means and piston rod.

5. In hydraulic control mechanism of the character referred to, a cylinder having end members and means for connecting operating pressure fluid with its opposite ends, a piston operable therein to be moved in opposite directions by pressure fluid, said piston having a piston rod extended from its opposite sides through said end members, one end of said piston rod being its work end and having means thereat for extending and contracting its active length, the other end of said piston rod being provided with abutment means, adjustable thereon and adapted to effect movement in one direction of said piston rod and its piston, spring means operable on said abutment means and piston rod for automatically moving said piston rod and piston to a predetermined position in case of failure of operating fluid in said cylinder, and means operable through said piston rod and piston, and connected with the means for extending and contracting the work end of said piston rod from the opposite end thereof, and enclosure means for said stop means and said piston rod and said means for adjusting the work end of said piston rod.

ARTHUR E. KREMILLER.

REFERENCES CITED

The following references are of record in the file of this patent:

UNITED STATES PATENTS

| Number | Name | Date |
|---|---|---|
| 369,467 | Pattrell | Sept. 6, 1887 |
| 818,639 | Price | Apr. 24, 1906 |
| 2,271,047 | Sloan | Jan. 27, 1942 |
| 2,298,008 | Goepfrich | Oct. 6, 1942 |
| 2,332,365 | Beebe | Oct. 19, 1943 |
| 2,346,868 | Perry | Apr. 18, 1944 |
| 2,352,736 | Richmond | July 4, 1944 |
| 2,368,791 | Waldie | Feb. 6, 1945 |
| 2,373,226 | Coates | Apr. 10, 1945 |
| 2,376,671 | Dodson | May 22, 1945 |
| 2,397,270 | Kelly | Mar. 26, 1946 |
| 2,397,876 | Martin | Apr. 2, 1946 |